(12) United States Patent
Kim et al.

(10) Patent No.: US 7,453,689 B2
(45) Date of Patent: Nov. 18, 2008

(54) PORTABLE COMPUTER

(75) Inventors: Yong-duck Kim, Suwon-si (KR);
Hyun-je Cho, Seongnam-si (KR);
Jong-ho Song, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 35 days.

(21) Appl. No.: 11/262,883

(22) Filed: Nov. 1, 2005

(65) Prior Publication Data

US 2006/0133024 A1 Jun. 22, 2006

(30) Foreign Application Priority Data

Dec. 20, 2004 (KR) ...................... 10-2004-0108833

(51) Int. Cl.
*G06F 1/16* (2006.01)
(52) U.S. Cl. ...................... 361/683; 361/680; 361/681; 361/682; 361/684; 361/685; 312/223.2
(58) Field of Classification Search ......... 361/679–685, 361/724–727; 312/223.1, 223.2, 223.3, 216, 312/217, 222, 291; 345/168, 169, 87, 901, 345/903, 905; 400/691, 714, 715; 248/116, 248/118.1, 63, 64, 128, 551–553, 106, 111, 248/119, 121, 917; 220/256, 326; 292/175, 292/DIG. 72
See application file for complete search history.

(56) References Cited

U.S. PATENT DOCUMENTS

| | | | | | |
|---|---|---|---|---|---|
| 5,132,876 A | * | 7/1992 | Ma | ............................ | 361/680 |
| 5,455,746 A | * | 10/1995 | Sato et al. | ................... | 361/816 |
| 5,552,967 A | * | 9/1996 | Seto et al. | ................... | 361/818 |
| 5,689,400 A | * | 11/1997 | Ohgami et al. | .............. | 361/683 |
| 5,768,093 A | * | 6/1998 | Howell et al. | ............... | 361/680 |
| 5,805,125 A | * | 9/1998 | Suganuma et al. | ............ | 345/87 |
| 6,014,311 A | * | 1/2000 | Shin et al. | ................... | 361/684 |
| 6,426,871 B2 | * | 7/2002 | Foster et al. | ................ | 361/683 |
| 6,727,894 B1 | * | 4/2004 | Karidis et al. | ............... | 345/174 |
| 6,771,492 B2 | * | 8/2004 | DeLuga et al. | .............. | 361/680 |
| 6,826,040 B2 | * | 11/2004 | Wang | ......................... | 361/681 |

(Continued)

FOREIGN PATENT DOCUMENTS

JP 07-104916 4/1995

(Continued)

OTHER PUBLICATIONS

Chinese Office Action dated Dec. 22, 2006 issued in CN 2005101268954.

(Continued)

*Primary Examiner*—Michael V Datskovskiy
(74) *Attorney, Agent, or Firm*—Stanzione & Kim, LLP

(57) ABSTRACT

The present general inventive concept relates to a portable computer including a computer main body, a display main body coupled with the computer main body, a main board provided in the computer main body, a keyboard provided in the computer main body and disposed in parallel with the main board without overlapping with the main board, and an auxiliary memory provided in the computer main body and disposed in parallel with the main board and the keyboard without overlapping with the main board and the keyboard. Thus, the present general inventive concept provides a portable computer having an improved structure to minimize its thickness.

23 Claims, 4 Drawing Sheets

U.S. PATENT DOCUMENTS

| | | | |
|---|---|---|---|
| 7,137,128 B2 * | 11/2006 | Shimada et al. | 720/601 |
| 7,170,742 B2 * | 1/2007 | Na et al. | 361/684 |
| 2005/0117286 A1 * | 6/2005 | Karashima et al. | 361/683 |

FOREIGN PATENT DOCUMENTS

| | | |
|---|---|---|
| JP | 10-049300 | 2/1998 |
| JP | 11-184562 | 7/1999 |
| JP | 2004-326499 | 11/2004 |
| KR | 2001-0091329 | 10/2001 |

OTHER PUBLICATIONS

Korean Office Action dated May 22, 2006 issued in KR 2004-108833.

* cited by examiner

PORTABLE COMPUTER

CROSS-REFERENCE TO RELATED APPLICATIONS

This application claims the benefit under 35 U.S.C. § 119(a) from Korean Patent Application No. 2004-108833, filed on Dec. 20, 2004, in the Korean Intellectual Property Office, the disclosure of which is incorporated herein by reference in its entirety.

BACKGROUND OF THE INVENTION

1. Field of the Invention

The present general inventive concept relates to a portable computer, and more particularly, to a portable computer having an improved structure to minimize thickness thereof.

2. Description of the Related Art

In general, a portable computer comprises a display main body to display a picture thereon, and a computer main body supporting the display main body and mounted with various hardware components. The portable computer includes a laptop computer, a notebook computer, a palmtop computer, etc.

Further, the portable computer additionally comprises an auxiliary unit such as a compact disc read only memory (CD-ROM) drive or the like, wherein the CD-ROM or an equivalent auxiliary unit is placed in the computer main body.

For example, a conventional portable computer having a mounting structure for an auxiliary unit has been disclosed in Korean Patent Application No. 2000-12867. Such a conventional portable computer comprises a keyboard placed on the computer main body, and an accommodating part placed under the keyboard and accommodating the auxiliary unit, such as the CD-ROM drive.

Thus, the conventional portable computer can easily accommodate the auxiliary unit, such as the CD-ROM drive, in the accommodating part placed in the computer main body.

However, in the conventional portable computer, the accommodating part is placed under the keyboard and overlapped with the keyboard, thereby increasing the thickness of the portable computer and deteriorating the portability of the portable computer.

SUMMARY OF THE INVENTION

The present general inventive concept provides a portable computer having an improved structure to minimize the portable computer thickness.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a portable computer including a computer main body, a display main body coupled with the computer main body, a main board provided in the computer main body, a keyboard provided in the computer main body and disposed in parallel with the main board without overlapping with the main board, and an auxiliary memory provided in the computer main body and disposed in parallel with the main board and the keyboard without overlapping with the main board and the keyboard.

The auxiliary memory may include an optical disk drive.

The optical disk drive may include a disc accommodating part to accommodate and to support a disc, and a disc cover placed in the computer main body to open and close the disc accommodating part.

The disc cover may be rotatably coupled with the computer main body and to open and/or close the disc accommodating part.

The auxiliary memory may further include a hard disk drive, and the hard disk drive and the optical disk drive may be disposed in parallel without overlapping with each other.

The portable computer may further include a battery placed in the computer main body and disposed in parallel with the main board, the keyboard and the auxiliary memory without overlapping with the main board, the keyboard and the auxiliary memory.

The portable computer may further include a touch pad placed in the computer main body and disposed in parallel with the main board, the keyboard and the auxiliary memory without overlapping with the main board, the keyboard and the auxiliary memory.

The keyboard may be placed in a front region of the computer main body, and the main board and the auxiliary memory may be placed in a back region of the computer main body.

The keyboard may be placed in a back region of the computer main body, and the main board and the auxiliary memory may be in front of the keyboard.

The thickness of the display main body and the computer main body together may range from 16 mm to 20 mm.

The display main body may be hingedly coupled with one edge of the computer main body.

The area of the display main body may be substantially equal to an area of the computer main body.

The foregoing and/or other aspects of the present general inventive concept may also be achieved by providing a portable computer comprising a main body including a keyboard, a main board, and auxiliary devices mounted therein without overlapping and substantially in parallel with each other, and a flat display rotatably coupled to one side of the main body to rotate with respect to the main body and to overlap the main body in a closed position.

The foregoing and/or other aspects of the present general inventive concept may also be achieved by providing a method of minimizing a thickness of a portable computer in a closed position, the method including disposing a keyboard, a main board, and auxiliary devices in a main body of the portable computer without overlapping each other and substantially in parallel with each other, and rotatably folding a flat display over the main body.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
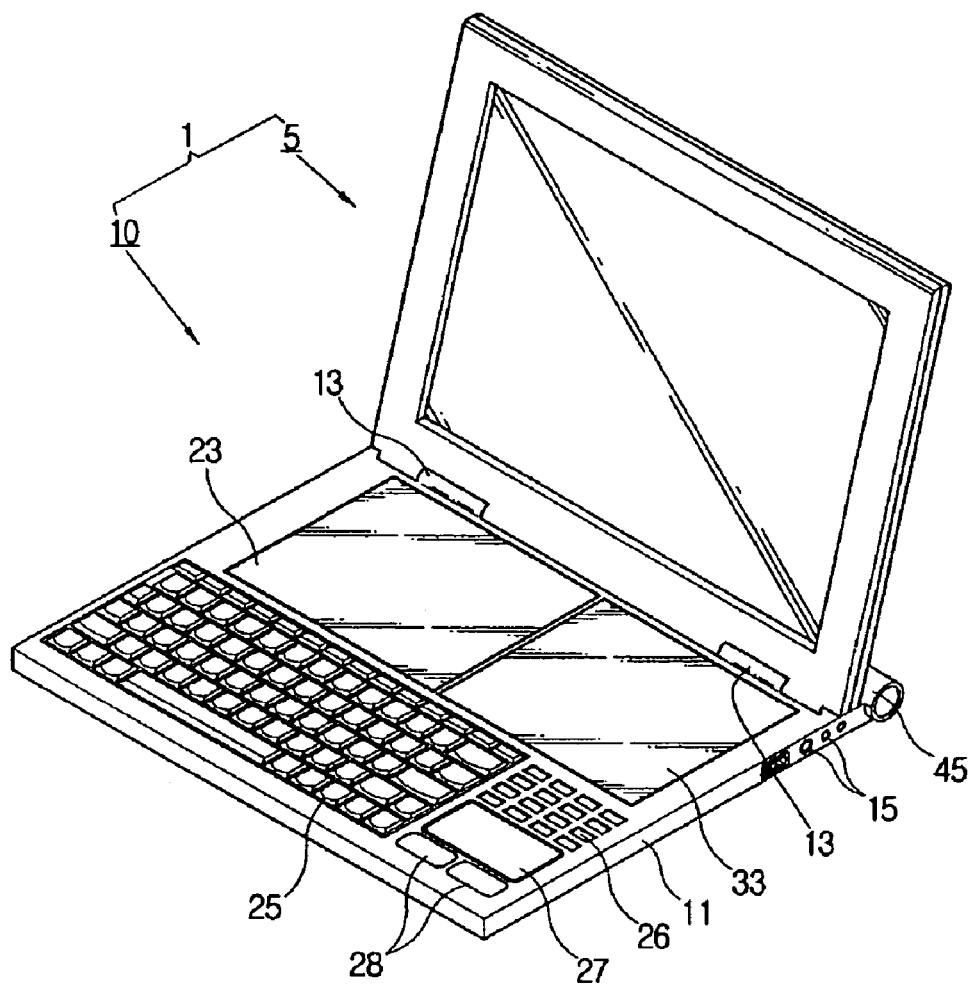
FIG. 1 illustrates a portable computer according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

Figure 2:
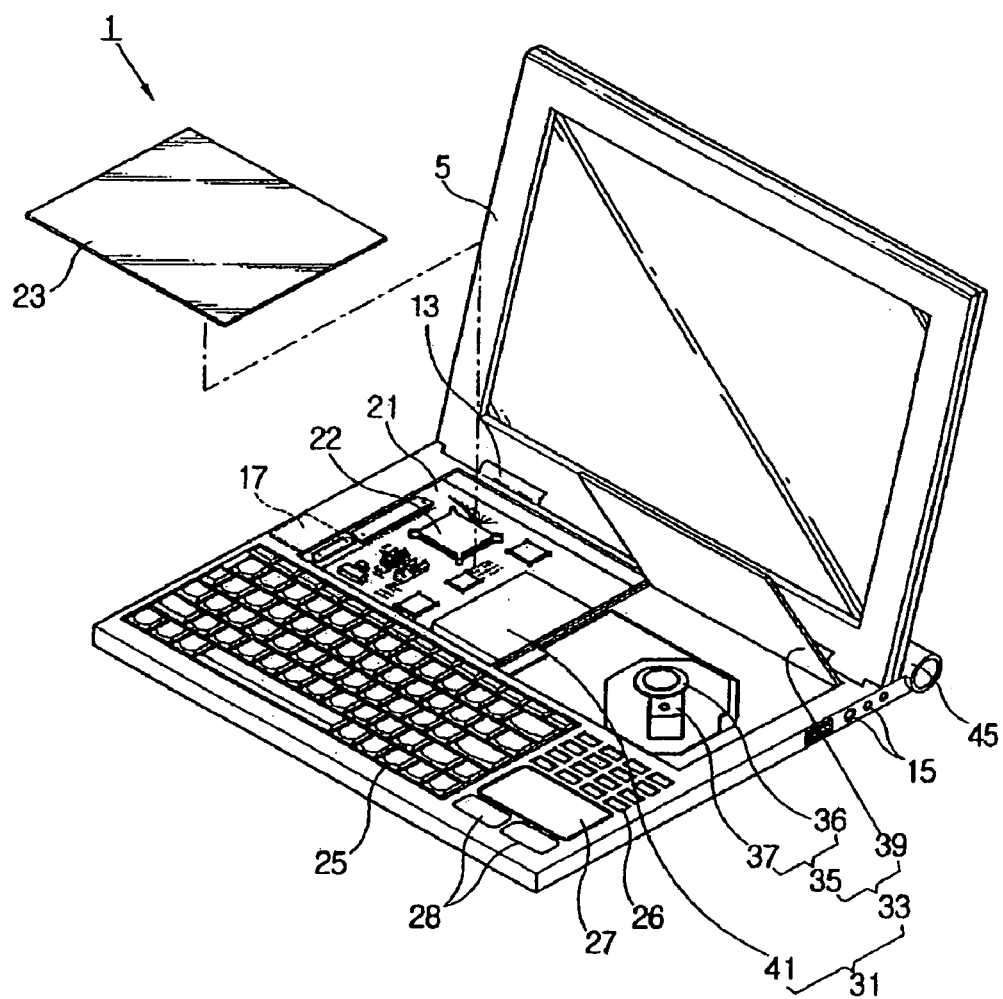
FIG. 2 is a partially exploded perspective view of the portable computer according to the embodiment of FIG. 1.

As illustrated in FIGS. 1 and 2, a portable computer 1 according to an embodiment of the present general inventive concept comprises a computer main body 10, a display main body 5 coupled with the computer main body 10, a main board 21 placed in the computer main body 10, a keyboard 25 placed in the computer main body 10 and disposed in parallel with the main board 21 without overlapping with the main board 21, and an auxiliary memory 31 placed in the computer main body 10 and disposed in parallel with both the main board 21 and the keyboard 25 without overlapping with both the main board 21 and the keyboard 25. According to the present embodiment, the portable computer 1 may further comprise a battery 45 placed in the computer main body 10 and disposed in parallel with the main board 21, the keyboard 25 and the auxiliary memory 31 without overlapping with the main board 21, the keyboard 25 and the auxiliary memory 31. According to the present embodiment, the portable computer 1 may further comprise a touch pad 27 placed in the computer main body 10 and disposed in parallel with the main board 21, the keyboard 25 and the auxiliary memory 31 without overlapping with the main board 21, the keyboard 25 and the auxiliary memory 31.

The computer main body 10 is protected by a casing 11 that defines an outer appearance of the computer main body. One or more hinges 13 couple the computer main body 10 with the display main body 5. The one or more hinges 13 allows the display main body 5 to rotate with respect to the computer main body 10 in a supporting manner such that the display main body 5 can maintain a tilted position at various angles.

The casing 11 has a first side provided with connection ports 15 to which an ear phone, a power source or other devices may be connected, and a second side provided with a card slot 17 to which a personal computer memory card international association (PCMCIA) card, a compact flash (CF) card, and other hardware devices having a communication card or a memory card may be mounted.

The display main body 5 comprises a display panel, such as a liquid crystal display (LCD) panel, to display image data thereon. The display main body 5 is coupled with the computer main body 10 by the one or more hinges 13 to be supportably tiltable at different angles. Thus, the display main body 5 may be rotated downward toward the computer main body 10 and folded onto the computer main body 10. Further, the display main body 5 may be rotated upward and away from the computer main body 10 (as illustrated in FIG. 1). According to the present embodiment, when the display main body 5 is folded onto the computer main body 10, a thickness of the display main body 5 and the computer main body 10 approximately ranges from 16 mm to 20 mm. Alternatively, the thickness of the display main body 5 and the computer main body 10 together may be less than the 16 mm or more than 20 mm.

The main board 21 is mounted with electronic components 22 such as a central processing unit (CPU), a random access memory (RAM), or the like. Here, the main board 21 is placed in the computer main body 10 and disposed in parallel with the keyboard 25 and the auxiliary memory 31 without overlapping with the keyboard 25 and the auxiliary memory 31. Further, the main board 21 is covered with a main board cover 23, which allows access to the main board 21 when the main board cover 23 is opened. As illustrated in FIG. 2, the main board 21 is placed in a back region of the computer main body 10. Alternatively, the main board 21 may be placed in another region of the computer main body 10 without overlapping with the keyboard 25 and the auxiliary memory 31.

As illustrated in FIGS. 1 and 2, the keyboard 25 is placed in a front region of the computer main body 10 without overlapping with the main board 21 and the auxiliary memory 31. Alternatively, the keyboard 25 may be placed in another region of the computer main body 10 without overlapping with the main board 21 and the auxiliary memory 31. The keyboard 25 may also include an auxiliary key pad 26, such as a function key pad, or a number key pad.

The touch pad 27 may be placed in a predetermined region adjacent to the keyboard 25 and allows a user to control a position of a movable indicator displayed on a screen of the display main body 5. Alternatively, the touch pad 27 may be placed in another region of the computer main body 10. Further, selection buttons 28 are placed adjacent to the touch pad 27 and allow a user to select the position of the movable indicator displayed on the screen of the display main body 5.

The auxiliary memory 31 may include an optical disk drive (ODD) 33. Further, the auxiliary memory 31 may include a hard disk drive (HDD) 41. However, the auxiliary memory 31 is not limited to the ODD 33 and the HDD 41, but may include various memories to store and output data as long as the auxiliary memory 31 is placed in the computer main body 10 and disposed without overlapping with the main board 21, and the keyboard 25. As illustrated in FIG. 2, the auxiliary memory 31 is placed in the back region of the computer main body 10 and disposed without overlapping with the main board 21 and the keyboard 25. Alternatively, the auxiliary memory 31 may be placed in another region of the computer main body 10 and disposed without overlapping with the keyboard 25 and the main board 21.

The ODD 33 is a device to write data on a disc, such as a compact disc (CD) or a digital versatile disc (DVD), and to read the data from the disc. The ODD 33 comprises a disc accommodating part 35 to accommodate and support the disc (not shown), and a disc cover 39 placed in the computer main body 10 to open and close the disc accommodating part 35. Further, the ODD 33 is placed in a back region of the computer main body 10 and disposed without overlapping with the main board 21 and the keyboard 25.

The disc accommodating part 35 comprises a disc support 36 to support the disc (not shown) in a rotating manner, and an optical pickup head 37 to write data on the disc supported by the disc support 36 and to read data from the disc.

The disc cover 39 placed over the disc accommodating part 35 may open and close the disc accommodating part 35. Here, the disc cover 39 is coupled with the computer main body 10 by a hinge (not shown) and can rotate to open/close the disc accommodating part 35. The disc cover 39 is called a shell type disc cover, but the disc cover 39 is not limited to the shell type disc cover. Alternatively, the disc cover 39 may have various types as long as the disc cover 39 opens/closes the disc accommodating part 35.

The HDD 41 is placed in the back region of the computer main body 10 and disposed without overlapping with the main board 21, the keyboard 25 and the ODD 33. As illustrated in FIG. 2, the HDD 41 may be placed between the main board 21 and the ODD 33 and covered by the main board cover 23.

The battery 45 is placed in the back region of the main board 21 and the auxiliary memory 31 and disposed without overlapping with the main board 21, the keyboard 25 and the auxiliary memory 31. Here, the battery 45 is detachably provided in the computer main body 10.

In the portable computer 1 having the described configuration according to the present embodiment, the main board 21, the keyboard 25 and the auxiliary memory 31 are placed in the computer main body 10 and disposed in parallel without overlapping with one another, thereby minimizing the thickness of the computer main body 10. Thus, when the display main body 5 is folded over the computer main body 10, the thickness of the display main body 5 and the computer main body 10 approximately ranges from 16 mm to 20 mm, so that the portable computer 1 is slim in its closed state. As the portable computer 1 is slim in its closed state, the portable computer 1 is handy to carry and has an attractive outer appearance.

Further, the portable computer 1 has an added quality in that the auxiliary memory 31, such as the ODD 33, can be mounted thereon.

Figure 3:
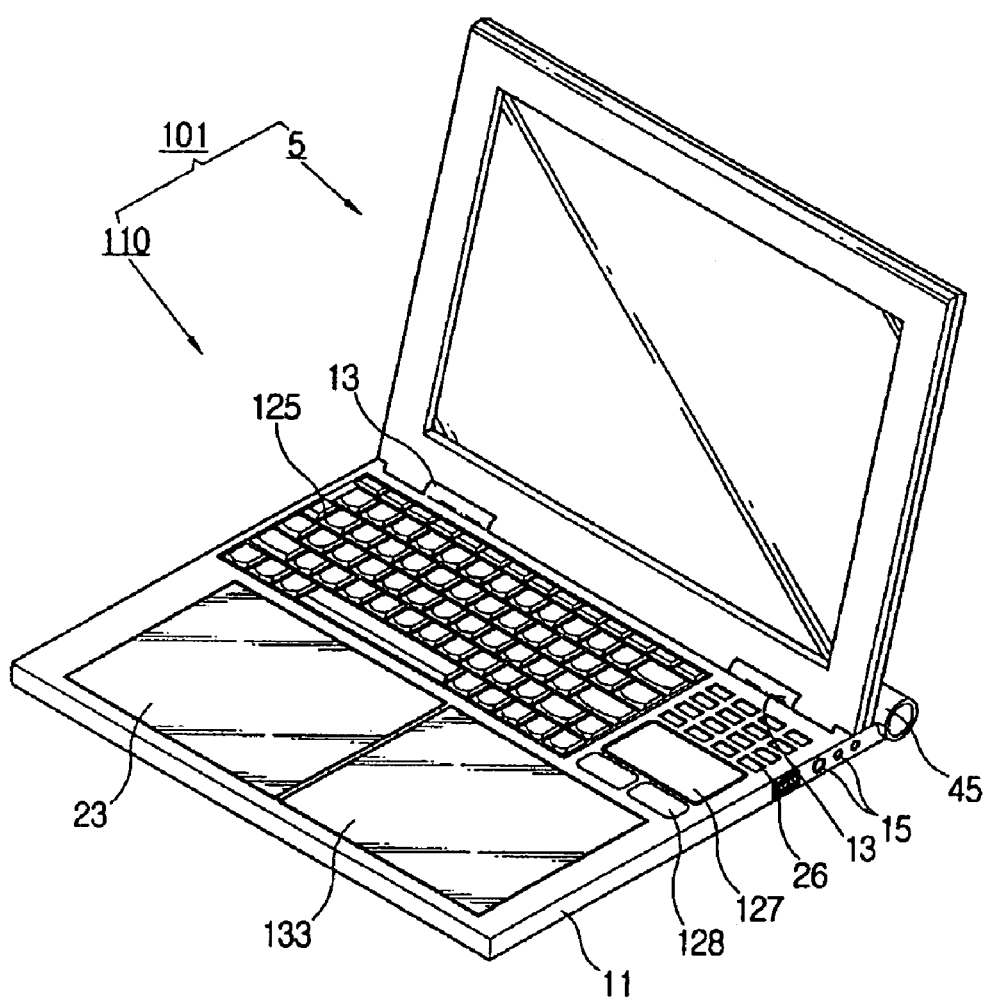
FIG. 3 illustrates a portable computer according to another embodiment of the present general inventive concept.
Figure 4:
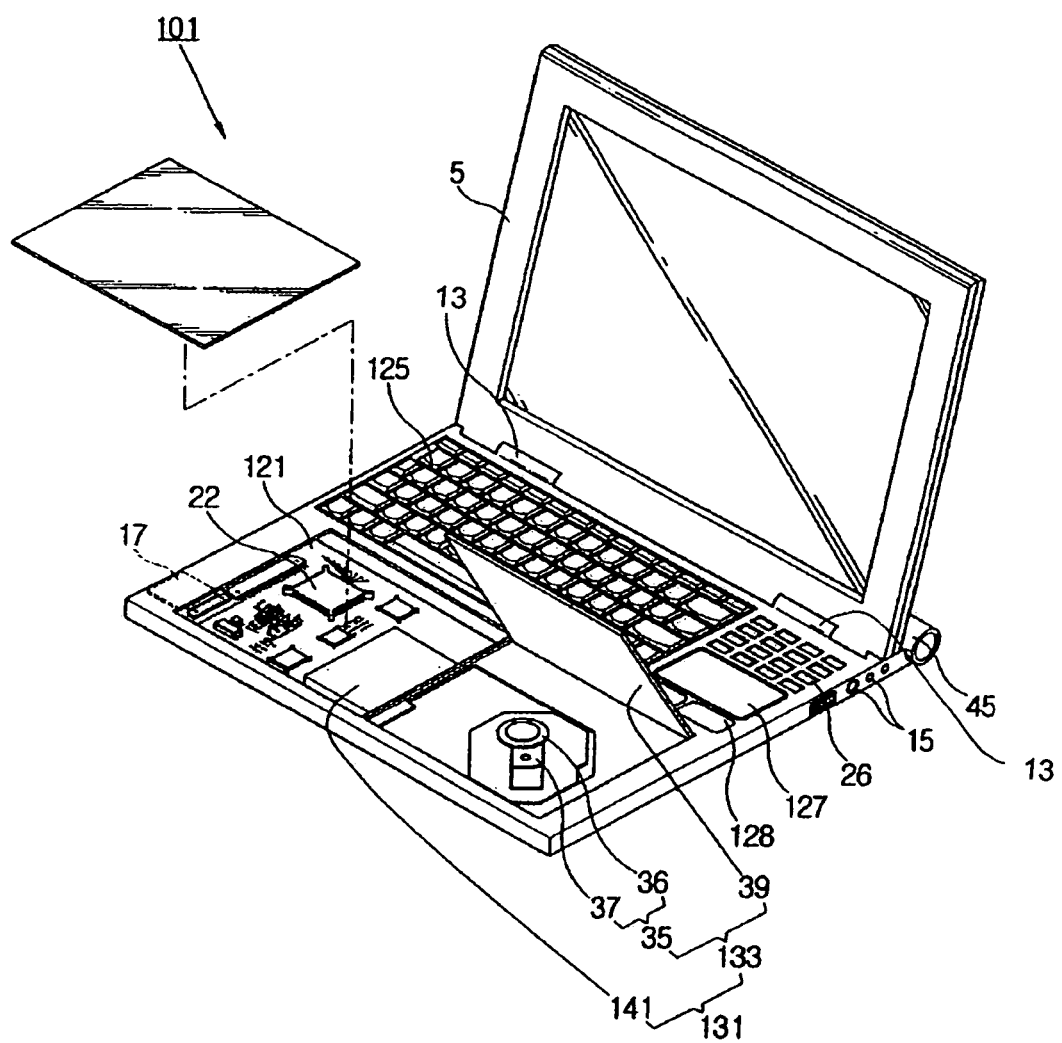
FIG. 4 is a partially exploded perspective view of the portable computer according to the embodiment of FIG. 3.

As illustrated in FIGS. 3 and 4, a portable computer 101 according to another embodiment of the present general inventive concept has a similar configuration as the previous embodiment except that a keyboard 125 is placed in a back region of a computer main body 110, and a main board 121 and an auxiliary memory 131 are placed in front of the keyboard 125.

The keyboard 125 may be positioned adjacent to a touch pad 127 and a selection button 128. However, the touch pad 127 and the selection button 128 may not be provided adjacent to the keyboard 125. Alternatively, the touch pad 127 and the selection button 128 may be placed in another region of the computer main body 110.

The auxiliary memory 131 includes an ODD 133 and an HDD 141 (see FIG. 4), wherein the ODD 133 and the HDD 141 are placed in the computer main body 110 and disposed in parallel without overlapping with each other.

The other components illustrated in FIGS. 3 and 4 are similar to components having same reference numbers of the previous embodiment, and thus repetitive descriptions are avoided.

Thus, in the portable computer according to the present embodiment, the main board, the keyboard and the auxiliary memory are placed in the computer main body and disposed in parallel without overlapping with one another, so that the thickness of the portable computer is minimized, thereby enhancing the portability and outer appearance thereof.

Further, the portable computer has an added quality in that the auxiliary memory, such as the ODD, can be mounted thereon.

As described above, the present general inventive concept provides a portable computer, in which a main board, a keyboard and an auxiliary memory are placed in a computer main body and disposed in parallel without overlapping with one another, so that the thickness of the portable computer is minimized, thereby enhancing the portability and outer appearance thereof.

Further, the present general inventive concept provides a portable computer having an added quality in that an auxiliary memory, such as an ODD, can be mounted thereon.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. A portable computer comprising:
a computer main body having a plurality of access covers disposed on an upper surface of the main body to provide access to an area under each of the respective plurality of covers;
a display main body coupled with the computer main body;
a main board provided in the computer main body;
a keyboard provided in the computer main body and disposed in parallel with the main board without overlapping with the main board; and
an auxiliary memory provided in the computer main body and disposed in parallel with the main board and the keyboard without overlapping with the main board and the keyboard,
wherein at least one of the plurality of access covers is disposed so as to provide access to the main board provided in the computer main body.

2. The portable computer according to claim 1, wherein the auxiliary memory comprises an optical disk drive.

3. The portable computer according to claim 2, wherein the optical disk drive comprises:
a disc accommodating part to accommodate and to support a disc; and a disc cover placed in the computer main body to open and close the disc accommodating part.

4. The portable computer according to claim 3, wherein the disc cover is rotatably coupled with the computer main body and rotates to open and/or close the disc accommodating part.

5. The portable computer according to claim 2, wherein the auxiliary memory further comprises a hard disk drive, and the hard disk drive and the optical disk drive are disposed in parallel without overlapping with each other.

6. The portable computer according to claim 1, further comprising:
a battery placed in the computer main body and disposed in parallel with the main board, the keyboard and the auxiliary memory without overlapping with the main board, the keyboard and the auxiliary memory.

7. The portable computer according to claim 1, further comprising:
a touch pad placed in the computer main body and disposed in parallel with the main board, the keyboard and the auxiliary memory without overlapping with the main board, the keyboard and the auxiliary memory.

8. The portable computer according to claim 1, wherein the keyboard is placed in a front region of the computer main body, and the main board and the auxiliary memory are placed in a back region of the computer main body.

9. The portable computer according to claim 1, wherein a thickness of the display main body and the computer main body together ranges from 16 mm to 20 mm.

10. The portable computer according to claim 1, wherein the display main body is hingedly coupled with one edge of the computer main body.

11. The portable computer according to claim 1, wherein an area of the display main body is substantially equal to an area of the computer main body.

12. A portable computer comprising:
a main body including a keyboard, a main board, and auxiliary devices mounted therein without overlapping and substantially in parallel with each other;
a flat display rotatably coupled to one side of the main body to rotate with respect to the main body and to overlap the main body in a closed position; and
a plurality of covers disposed on an upper surface of the main body to provide access to an area beneath each one of the plurality of covers by opening a respective one or more of the plurality of covers, wherein at least one of the plurality of covers is disposed so as to provide access to the main board provided in the main body.

13. The portable computer according to claim 12, wherein the auxiliary devices include at least one of a battery, a touchpad, auxiliary keys, selection buttons, and an auxiliary memory.

14. The portable computer according to claim 12, wherein a thickness of the main body and the flat display together when the flat display rotated directly above the main body is substantially between 16 mm and 20 mm.

15. The portable computer according to claim 12, wherein the flat display is rotatably coupled to the main body by one or more hinges.

16. The portable computer according to claim 12, wherein on the upper surface of the main body are disposed a plurality of rotatable covers to cover and protect the main board and the auxiliary devices, and to rotate away from the main body to provide access to the main board and the auxiliary devices.

17. The portable computer according to claim 12, wherein the flat display comprises an LCD.

18. The portable computer according to claim 12, wherein the keyboard, the main board, and the auxiliary devices are mounted without overlapping and substantially parallel with each other in the main body according to one of a plurality of arrangements within an area substantially equal to an area of the flat display.

19. A method of minimizing a thickness of a portable computer in a closed position, the method comprising:

disposing a keyboard, a main board, and auxiliary devices in a main body of the portable computer without overlapping each other and substantially in parallel with each other, wherein the main body includes a plurality of covers disposed on an upper surface of the main body to provide access to an area beneath each one of the respective plurality of covers, and wherein at least one of the plurality of covers is disposed so as to provide access to the main board disposed in the main body; and rotatably folding a flat display over the main body.

20. A portable computer comprising:

a computer main body including a plurality of access covers disposed on an upper surface of the main body to provide access to an area beneath each one of the respective plurality of covers;

a display main body coupled with the computer main body;

a keyboard disposed in a front of a first plane of the computer main body, which is a plane contacting the display main body when closed, and placed oppositely to a coupling direction of the display main body;

a main board placed in any one of a second plane or a third plane of the computer main body separated from a rear surface of the first plane, and placed between the keyboard and the display main body, wherein at least one of the plurality of access covers is disposed so as to provide access to the main board; and an optical disk drive (ODD) including a disc accommodating part supporting and accommodating a disc in the other one of the second plane or third plane, and a disc cover which is one of the plurality of access covers to open and close the disc accommodating part.

21. The portable computer according to claim 20, wherein the keyboard has a top surface constituting a par of the first plane.

22. The portable computer according to claim 20, wherein the main board has a top surface placed below the first plane.

23. The portable computer according to claim 22, wherein the disc cover has a top surface constituting a part of the first plane.

* * * * *